3,019,083
Patented Jan. 30, 1962

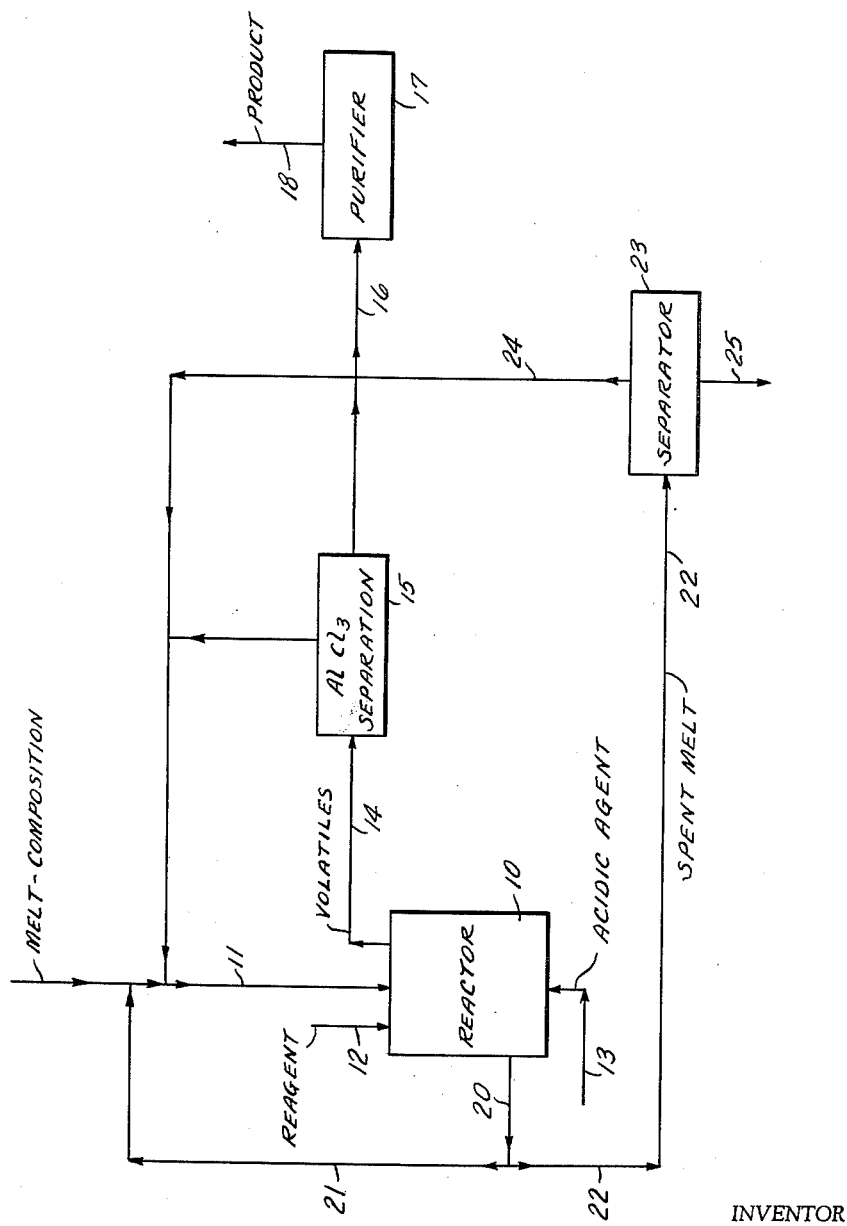

3,019,083
PROCESS FOR PREPARING DIBORANE
John P. Faust, Grand Island, N.Y., assignor, by mesne assignments, to Olin Mathieson Chemical Corporation, a corporation of Virginia
Filed Nov. 10, 1953, Ser. No. 391,253
8 Claims. (Cl. 23—204)

My invention relates to the production of diborane from an alkali metal borohydride. The production of diborane from alkali metal borohydrides presents a problem because of the extreme insolubility of the borohydrides in solvents of practical commercial utility. Thus it has been thought necessary to utilize diethyl ether as a reaction medium for the generation of diborane from an alkali metal borohydride.

I have discovered that diborane may be produced from an alkali metal borohydride such as sodium borohydride by addition of the borohydride with an acid to a fused salt system comprising an amphoteric chloride such as aluminum chloride or zinc chloride and an alkali metal chloride. The alkali metal chloride of the salt bath should contain the same alkali metal as that of the borohydride employed. The reaction of the borohydride in a fused salt bath presents difficulties because diborane decomposes rapidly above 200° C. so that a low melting system is required. The reaction of borohydrides may result in the formation of highly unstable intermediates inducing violent reactions, and the separation of products and components of the fused salt system in a commercially feasible manner becomes a difficult problem.

I have found that desirably low melting fused salt baths comprising aluminum chloride or zinc chloride and an alkali metal chloride such as sodium chloride or potassium chloride can be formed. Although the reaction probably goes through formation of intermediates, diborane is the only major product and is readily removed from the reaction mixture as a gas substantially as it is formed. In addition, the aluminum chloride employed is readily recovered from the alkali metal chloride if a continuous process is employed withdrawing a portion of the fused salt system continuously to prevent undue buildup of the alkali metal chloride produced as a by-product in the system. The aluminum chloride can be distilled out of the salt system or it can be extracted with an organic solvent such as ether. Zinc chloride also can be recovered by extraction.

In the practice of the invention, a fused salt system containing the amphoteric metal chloride and the alkali metal chloride in approximately equal proportions is maintained in a reaction zone. So far as I know, the proportions of the melt components are not critical in the sense of the reaction but should be selected with a view to obtaining the lowest convenient eutectic melting point. A representative bath composition of sodium chloride and aluminum chloride is for example 61 mole percent aluminum chloride and 39 mole percent sodium chloride, resulting in a melting point of 112° C. The alkali metal borohydride, most advantageously sodium borohydride, may be added in dry form, incrementally or continuously, to the fused salt system. An acid such as hydrogen chloride or boron trichloride is added as a gas in a manner promoting effective contact with the fused salt system and the sodium borohydride that is being charged. The yield of diborane appears to be promoted by increasing the ratio of aluminum chloride to sodium borohydride. The best yields that I have obtained to date have been produced with an aluminum chloride-sodium borohydride ratio of the order of about 12 to 1. I have found that either hydrogen chloride or boron trichloride is suitable as the acid contacting gas since neither adds an extraneous component to the fused salt system which would complicate continuous operation on a commercial scale. I have found that the use of hydrogen chloride is particularly advantageous because a continuous system then requires only addition of sodium borohydride and hydrogen chloride and removal of sodium chloride to prevent buildup, with recycle of aluminum chloride, assuming that aluminum chloride losses are minimized. Yields moreover appear to be higher with hydrogen chloride since some chloro diborane is formed when boron trichloride is employed.

The following equations are believed to represent the process for the production of diborane from $AlCl_3$, $NaBH_4$ and $HCl$.

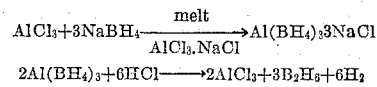

$$2Al(BH_4)_3 + 6HCl \longrightarrow 2AlCl_3 + 3B_2H_6 + 6H_2$$

It may be possible that the following reaction also occurs:

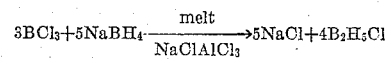

In the case of zinc, the reaction is postulated as

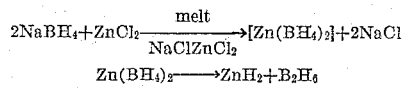

$$Zn(BH_4)_2 \longrightarrow ZnH_2 + B_2H_6$$

The invention will be further described with reference to the simplified flow plan of the accompanying drawing.

A fused salt system of aluminum chloride and sodium chloride is maintained in reactor 10 which may be charged by line 11. When the reactor is initially charged, the mixture is heated to the melting point or higher with agitation in an atmosphere of dry nitrogen. After the desired melt has been obtained, the flow of hydrogen chloride or boron trichloride is started through line 13. Solid sodium borohydride may be added in small increments through connection 12. Diborane is evolved and the vented gases are passed by means of line 14 through an aluminum chloride separator 15 which may take the form of a cyclone separator or filter to eliminate aluminum chloride carry-over. The gas stream from separator 15 is passed through a purifier 17 which may take the form of a drum packed with an alkaline solid material to remove hydrogen chloride or boron trichloride by adsorption. The diborane leaving purifier 17 by means of connection 18 may be collected in the usual manner by refrigerated cooling. A portion of the fused salt mixture may be continuously withdrawn from reactor 10 by means of connection 20 for recirculation through line 21 to provide a countercurrent contact system or a purge stream may be continuously withdrawn to separator 23 by means of line 22. Aluminum chloride may be recovered by distillation, or if desired by extraction, in the separation zone 23 for recycle by means of line 24 to reactor 10. An amount of sodium chloride equivalent to the amount of sodium borohydride added to the system by line 12 may be withdrawn from separator 23 by means of line 25 to maintain the system in balance.

In the process, the alkali metal borohydride serves as the source of boron and hydrogen. The aluminum chloride or zinc chloride appears to be necessary to form an aluminum borohydride or zinc borohydride intermediate which is not isolated. The acid serves to decompose the aluminum or zinc borohydride into the diborane product which is evolved as the gas. The aluminum or zinc chloride is formed again and is available for reuse. The mixture of the amphoteric chloride plus sodium chloride acts as the reaction medium. In controlling the process, it is important for good yields that the temperature of the reaction medium is kept low, i.e., below about 200° C. One of the unique advantages of the amphoteric chloride-alkali metal chloride salt bath is that there is practically no other salt bath composed of such cheap and readily available materials, melting at such low temperatures. Moreover, so far as is now known, no other solvents are known which are suitable for the reaction applied according to the invention. Potassium borohydride and correspondingly potassium chloride may be employed instead of the corresponding sodium salts. Likewise the corresponding salts of other alkali metals, e.g., lithium, may be employed from the standpoint of technical feasibility although their commercial practicability is exceedingly doubtful.

Similarly, other halide reaction materials may be employed, for example, copper chloride as the amphoteric halide and boron trifluoride as the acid although no reason is now known for commercial employment of such materials.

The following examples illustrate experimental application of the invention:

Example I

A 300 gram mixture comprised of aluminum chloride and sodium chloride (61–39 mole percent respectively) was placed in a reactor consisting of a three-liter, four-necked flask, stirrer, thermowell and a cold-finger (−80° C.). The reactor was attached to a fractionation line consisting of a cold-trap which was maintained at −80° C., a pyridine-borine scrubber, and two cold-traps which were maintained at −196° C.; all traps were connected in series. Dry nitrogen was passed through the reactor for about fifteen minutes and the salt mixture was stirred and heated to 125° C. A mixture of hydrogen chloride and nitrogen was passed over the surface of the fused-salt system and 0.1263 mole of sodium borohydride was added to the reaction mixture over a period of 0.58 hour. The reaction mixture was heated at 115° C.–140° C. for 0.92 additional hour. The crude product was fractionated through a cold-trap at −140° C. and expanded into a known volume. The yield of diborane (0.0239 mole), V.P. 233 mm. Hg at −112.5° C., was 42 percent based on 0.1145 mole of sodium borohydride reacting.

Example II

A 300 gram mixture comprised of aluminum chloride-sodium chloride (61–39 mole percent respectively) was added to a reactor similar to that of Example I. The fractionation system consisted of three cold-traps connected in series, one maintained at −160° C., and two at −196° C. Dry nitrogen was passed through the reactor for about fifteen minutes during which time the salt mixture was heated to 125° C. Then a mixture of nitrogen and boron trichloride was passed through the reactor and sodium borohydride (0.1480 mole) was added to the melt over a period of 0.72 hour. The reaction mixture was maintained at 120° C.–125° C. for 2.92 additional hours. The crude diborane was fractionated through a trap at −160° C. The uncorrected yield of crude diborane, V.P. 239 mm. Hg at −113° C., was 59 percent based on sodium borohydride.

In addition to the advantages of the process in affording a commercially practicable procedure for producing diborane from alkali metal borohydrides, the process avoids the isolation of extremely hazardous intermediates such as aluminum borohydride and zinc borohydride. The process can be readily controlled by the rate of addition of the acid in a manner directly controlling the rate of production of diborane. The small amount of higher hydrides of boron which are generally formed as undesirable by-products in my process for the production of diborane remain behind in the salt bath and can be readily disposed of during recovery of the amphoteric metal halide. A catalyst such as Monel metal or copper turnings may be employed to accelerate the process reaction. Conversely, catalysts such as stainless steel sheet or wire can be used to stabilize temporarily the unstable intermediates in order to prevent their decomposition too rapidly into undesirable by-products.

I claim:

1. A process for the production of diborane from an alkali metal borohydride which comprises adding the borohydride and an acid selected from the group consisting of hydrogen chloride and boron chloride to a fused salt system comprising an alkali metal chloride and an amphoteric chloride selected from the group consisting of aluminum chloride and zinc chloride.

2. The process of claim 1 wherein the amphoteric chloride is aluminum chloride.

3. The process of claim 1 wherein the acid is hydrogen chloride.

4. The process of claim 1 wherein the borohydride is sodium borohydride and the alkali metal chloride of the fused salt system is sodium chloride.

5. The process of claim 1 wherein the amphoteric chloride is zinc chloride.

6. The process of claim 1 wherein the acid is boron chloride.

7. A continuous process for the production of diborane from an alkali metal borohydride which comprises circulating a fused salt mixture comprising an alkali metal chloride and an amphoteric chloride selected from the group consisting of aluminum chloride and zinc chloride through a reaction zone, contacting the fused salt mixture with an acid selected from the group consisting of hydrogen chloride and boron chloride, adding the borohydride to the reaction zone, removing diborane evolved as a gas from the reaction zone, separating the amphoteric chloride from a portion of the fused salt mixture circulating from the reaction zone and recycling it with the balance of the circulating salt mixture to the reaction zone.

8. A process for the production of diborane from an alkali metal borohydride which comprises adding the borohydride and an acid selected from the group consisting of hydrogen chloride and boron chloride to a fused salt system comprising an alkali metal chloride and aluminum chloride.

References Cited in the file of this patent

UNITED STATES PATENTS 2,469,879   Hurd _____ May 10, 1949

UNITED STATES PATENT OFFICE

CERTIFICATE OF CORRECTION

Patent No. 3,019,083 January 30, 1962

John P. Faust

It is hereby certified that error appears in the above numbered patent requiring correction and that the said Letters Patent should read as corrected below.

Column 2, lines 15 to 17, the equation should appear as shown below instead of as in the patent:

$$AlCl_3 + 3NaBH_4 \xrightarrow[AlCl_3 \cdot NaCl]{melt} Al(BH_4)_3 + 3NaCl$$

Signed and sealed this 26th day of June 1962.

(SEAL)
Attest:

ERNEST W. SWIDER
Attesting Officer

DAVID L. LADD
Commissioner of Patents